US009225620B2

(12) United States Patent
Hoole

(10) Patent No.: US 9,225,620 B2
(45) Date of Patent: Dec. 29, 2015

(54) SYSTEMS AND METHODS FOR SELF-OPTIMIZATION IN WIRELESS BASE STATIONS BY DETECTION OF INTERFERENCE AT THE EDGE OF A RECEIVED RADIO FREQUENCY BAND

(75) Inventor: Elliott Hoole, Sammamish, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 525 days.

(21) Appl. No.: 12/709,382

(22) Filed: Feb. 19, 2010

(65) Prior Publication Data

US 2010/0214941 A1    Aug. 26, 2010

Related U.S. Application Data

(60) Provisional application No. 61/155,236, filed on Feb. 25, 2009.

(51) Int. Cl.
*H04L 12/26* (2006.01)
*H04B 1/10* (2006.01)
*H04W 24/02* (2009.01)
*H04W 84/04* (2009.01)

(52) U.S. Cl.
CPC ............. *H04L 43/08* (2013.01); *H04B 1/1027* (2013.01); *H04W 24/02* (2013.01); *H04B 2001/1045* (2013.01); *H04W 84/045* (2013.01)

(58) Field of Classification Search
CPC ............. H04B 1/1027; H04B 2001/1045
USPC ........... 370/252, 253, 328–338, 465, 468, 370/503–516; 455/63.1, 63.2, 67.13, 443, 455/450, 451, 452.1, 452.2
See application file for complete search history.

(56) References Cited

U.S. PATENT DOCUMENTS

| | | | |
|---|---|---|---|
| 2004/0136400 A1 | 7/2004 | Majidi-Ahy et al. | |
| 2007/0297323 A1* | 12/2007 | Seki | 370/208 |
| 2008/0014877 A1* | 1/2008 | Hulkkonen et al. | 455/114.2 |
| 2008/0057934 A1 | 3/2008 | Sung et al. | |
| 2008/0075061 A1* | 3/2008 | Hatala et al. | 370/350 |
| 2008/0146227 A1 | 6/2008 | Wu | |
| 2008/0268833 A1 | 10/2008 | Huang et al. | |
| 2010/0136989 A1* | 6/2010 | Westerberg et al. | 455/450 |
| 2010/0150013 A1* | 6/2010 | Hara et al. | 370/252 |
| 2010/0177722 A1* | 7/2010 | Guvenc | 370/329 |
| 2011/0092162 A1* | 4/2011 | Mattsson | 455/63.1 |

FOREIGN PATENT DOCUMENTS

JP    WO 2008/146494    * 12/2008    ............... H04B 7/04

OTHER PUBLICATIONS

The International Search Report and Written Opinion for PCT/US2010/024828 dated Oct. 11, 2010.

* cited by examiner

*Primary Examiner* — Pao Sinkatarakorn

(57) ABSTRACT

Systems and methods are described for reducing an interference level associated with frequency drift in a wireless base station. The base station monitors an interference level in a frequency resource caused by a first frequency resource colliding with a second frequency resource. If the interference level is outside of an expected range, the base station adjusts a parameter of the base station such as a reference oscillator frequency to compensate for frequency drift. This method may be used in a femtocell wireless base station.

19 Claims, 8 Drawing Sheets

SYSTEMS AND METHODS FOR SELF-OPTIMIZATION IN WIRELESS BASE STATIONS BY DETECTION OF INTERFERENCE AT THE EDGE OF A RECEIVED RADIO FREQUENCY BAND

CROSS REFERENCE TO RELATED APPLICATIONS

The present application claims the benefit of U.S. Provisional Application No. 61/155,236, filed Feb. 25, 2009, which is incorporated herein by reference.

FIELD OF THE INVENTION

The field of the present invention generally relates to systems and methods of self-optimizing radio access nodes that detect interference at the edge of the received radio frequency band. This optimization is intended to adjust a carrier frequency used by the radio access node to enhance network synchronization.

BACKGROUND OF THE INVENTION

In cellular networks, radio access base stations must use a very accurate time base as a reference for their frequency generation circuitry and other components. In order to achieve the required degree of accuracy, which is typically on the order of 0.05 parts per million (ppm), this reference must be even more accurate which thus requires specialized hardware. Various synchronization schemes include synchronizing with an atomic clock, using a frequency derived from a dedicated backhaul connection (e.g., deriving a frequency reference from a T1, E1, or fiber optic cable in conjunction with a Stratum-1 clock as a reference), or using a frequency reference provided by a Global Positioning System (GPS) receiver. These reference schemes are practical in larger base stations where cost sensitivity is low and a fixed line backhaul is standard.

A new type of base station providing personalized coverage has become attractive to some carriers for subscribers' homes and small offices rather than covering large districts of urban or sub-urban areas. These new base stations are known as femtocells, and are characterized by much smaller coverage areas, consumer-grade packaging and price-points, and the use of consumer internet protocol (IP) connections using various common wireline technologies. These wireline technologies, may include, but are not limited to: DSL, DOCSIS, powerline, and/or coaxial cable. The lack of a fixed line backhaul and extreme cost sensitivity of these femtocells require different synchronization schemes than larger cells use. Additionally, traditional GPS synchronization may not work with femtocells as they are typically installed indoors where a GPS receiver cannot receive a signal from the GPS satellite system that is required to provide the high accuracy frequency reference.

One popular synchronization scheme for femtocells is the IEEE 1588 standard which addresses this issue quite well under normal circumstances. Timing packets are provided over the IP network and the femtocells effectively use the arrival events of these packets as a timebase after filtering out jitter and other errors created by the IP network. A local oscillator in the femtocell is typically used as a local timebase, and this local timebase is compared with the packet-driven timebase. The frequency of the local oscillator is adjusted so that the two timebases are synchronized.

When the IP connection is stable and the network is lightly loaded, this packet-based synchronization scheme works quite well. But as network loading increases and creates more packet jitter and other errors such as packet loss, the derived synchronization error can increase and may cause the femtocell carrier frequency to exceed a specified error tolerance. In one extreme case, the consumer IP network may be out of service completely and the timing packets would not be available to keep the femtocell adjusted properly.

If a femtocell is using a packetized time base reference signal sent over a network, the femtocell must rely on a local oscillator if the network is unavailable. In this situation, prior art systems have relied on ovenized oscillators to keep an accurate frequency reference. However, these ovenized oscillators are relatively expensive and require calibration. Less precise oscillators encounter frequency drift as a result of manufacturing variations or environmental factors such as temperature, humidity, or the age of the oscillator.

In general, the local oscillator is used to generate a carrier frequency, which in turn is used by a radio access node to generate a transmission signal for wireless communications. Within the transmission signal, each wireless resource, e.g. a resource block or channel, is allocated a unique frequency. When the carrier frequencies for neighboring radio access nodes are synchronized, the resource blocks are transmitted within their specified values, and there is little interference between wireless resources.

However, when a femtocell carrier frequency exceeds the specified error tolerance, a downlink transmission to a mobile device will be outside an allocated frequency range. The mobile device may tolerate this error and receive the downlink. When the mobile device sends an uplink transmission back to its associated radio access node, energy from adjacent frequency resource blocks that are used by neighboring cells will spill into the frequency resource blocks being used by the mobile device and femtocell. When this situation occurs it is an indication of carrier frequency error, and there will be significant interference in the received radio frequency band.

Presently, there is a need for improved systems and methods that facilitate the femtocell taking corrective action in the event of a carrier frequency error. It would be beneficial if the femtocell could detect its own frequency error based on the indications of other parts of the network. To date, systems and methods for addressing carrier frequency error have focused on ensuring there is no deviation in the carrier signal. This approach has worked in large macrocell, microcell, and picocell radio access nodes, but does not scale well for use in a femtocell eNodeB base station.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with traditional synchronization schemes in wireless communications, a self-optimizing radio access node, and method of adjusting the node, includes, but is not limited to, detecting interference at the edge of the received radio frequency band in a radio access node base station.

The present invention may include a wireless communication system comprising: a first base station using a first frequency resource and a second base station using a second frequency resource, wherein the first base station is configured to: monitor an interference level in a portion of the first frequency resource adjacent to the second frequency resource; determine when the interference level indicates a frequency error; and adjust a reference of the first base station to correct a frequency of the first frequency resource used by the first base station.

In accordance with another aspect of the present invention, the system may include adjusting a carrier frequency of the first frequency resource.

In accordance with another aspect of the present invention, adjusting the reference of the first base station reduces the interference level between the first frequency resource and the second frequency resource.

In accordance with another aspect of the present invention, the system may include receiving an uplink transmission from a mobile device including the first frequency resource; and encountering interference from the second frequency resource.

In accordance with another aspect of the present invention, the first frequency resource is a first frequency band used by the first base station to wirelessly communicate with one or more mobile device, and the second frequency resource is a second frequency band used by the second base station to wirelessly communicate with one or more mobile device.

In accordance with another aspect of the present invention, the first base station is associated with a first coverage area, the second base station is associated with a second coverage area, and a portion of the first coverage area and a portion of the second coverage spatially overlap.

In accordance with another aspect of the present invention, the first base station is a femtocell base station.

The present invention may further include a computer implemented method for reducing wireless interference in a base station, comprising: receiving a first frequency resource used by a first base station; encountering interference from a second frequency resource used by a second base station; monitoring an interference level in a portion of the first frequency resource adjacent to the second frequency resource; determining when the interference level indicates a frequency error; and adjusting a reference of the first base station to correct a frequency of the first frequency resource used by the first base station.

In accordance with another aspect of the present invention, the method may include adjusting a carrier frequency of the first frequency resource.

In accordance with another aspect of the present invention, adjusting the reference of the first base station reduces the interference level between the first frequency resource and the second frequency resource.

In accordance with another aspect of the present invention, the method may include receiving an uplink transmission from a mobile device, and encountering adjacent channel interference.

In accordance with another aspect of the present invention, the first frequency resource is a first frequency band used by the first base station to wirelessly communicate with at least one mobile device, and the second frequency resource is a second frequency band used by the second base station to wirelessly communicate with at least one mobile device.

In accordance with another aspect of the present invention, the first base station is associated with a first coverage area, the second base station is associated with a second coverage area, and a portion of the first coverage area and a portion of the second coverage spatially overlap.

In accordance with another aspect of the present invention, the adjusting is performed automatically by the first base station in response to the determination of the frequency error.

In accordance with a further aspect of the present invention is a computer readable medium encoded with computer-executable instructions for reducing wireless interference in a base station, which when executed, performs a method comprising: receiving a first frequency resource used by a first base station; encountering interference from a second frequency resource used by a second base station; monitoring an interference level in a portion of the first frequency resource adjacent to the second frequency resource; determining when the interference level indicates a frequency error; and adjusting a reference of the first base station to correct a frequency of the first frequency resource used by the first base station.

BRIEF DESCRIPTION OF THE DRAWINGS

Preferred and alternative examples of the present invention are described in detail below by way of example and with reference to the drawings, in which.

DETAILED DESCRIPTION

Figure 1:
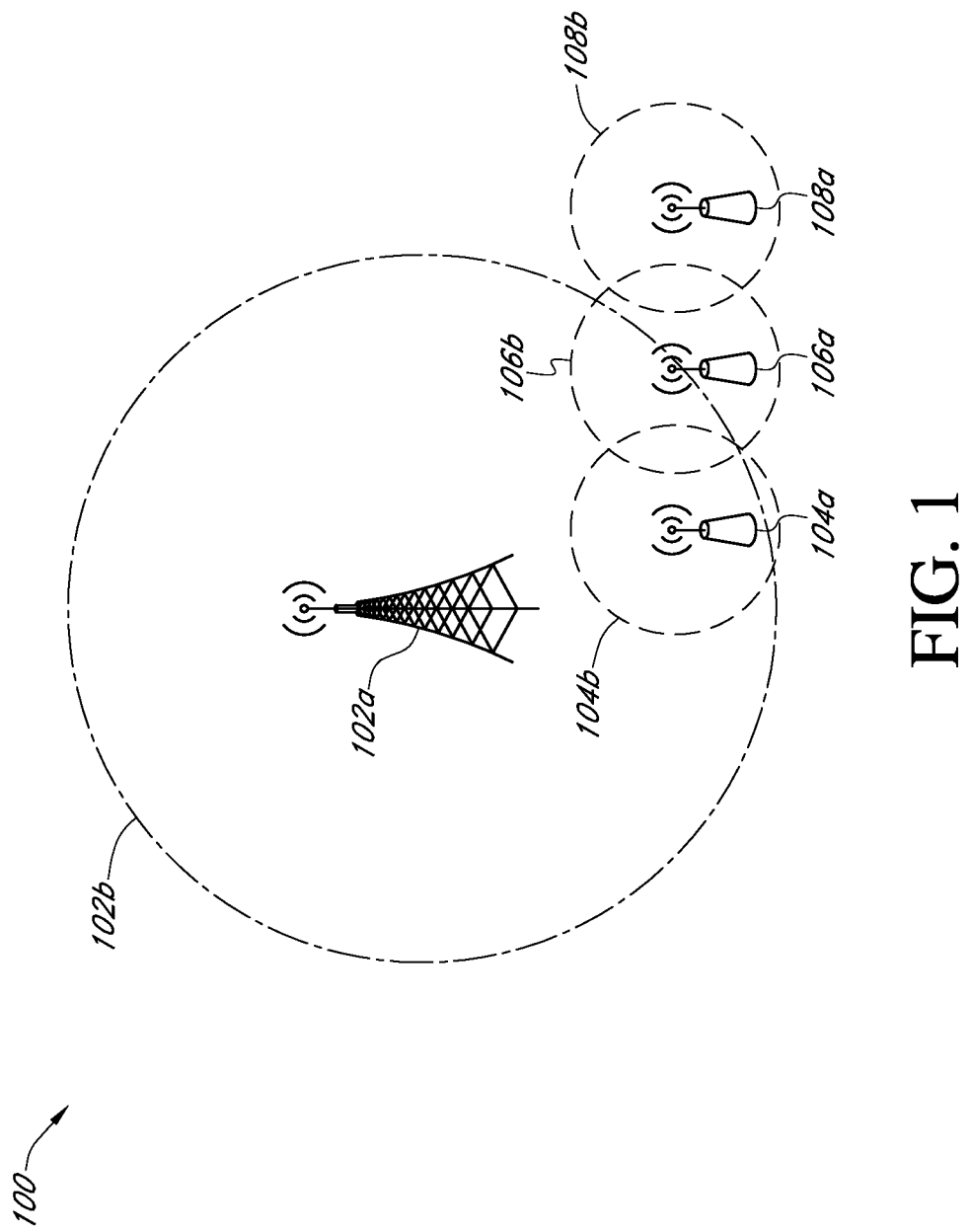
FIG. 1 illustrates a network topology comprising various network base stations as part of a larger data communications network in accordance with an embodiment of the present invention.

In accordance with an exemplary embodiment of the present invention, FIG. 1 illustrates a generic cell topology 100 depicting cell coverage regions resulting from extemporaneous deployment methodology. The generic cell topology 100 may include, but is not limited to, one or more macrocell base stations 102a with a corresponding coverage area 102b. Generic cell topology also includes several femtocell base stations 104a, 106a, and 108a, each with a corresponding coverage area 104b, 106b, and 108b. Cell coverage areas 102b, 104b, 106b, and 108b overlap in varying degrees according to their placement in the generic cell topology 100. This tightly knit cell topology can cause interference in frequency resources which is addressed by the present invention.

In accordance with various embodiments of the present invention, a wide-area or wide-range base station (e.g., base station 102a) may be considered to be any of a macrocell, a microcell, or a picocell base station, depending on the reference coverage area provided by the small-area or short-range wireless transceiver device(s) (e.g., a femtocell or a picocell device) to which the base station coverage area is being compared. Similarly, in accordance with various embodiments of the present invention, a small-area or short-range wireless transceiver device (e.g., base stations 104a, 106a, and 108a) may be considered to be either a femtocell (e.g., a short-range base station device such as a Home eNodeB) or a picocell device, depending on the reference coverage area provided by neighboring wider coverage area base stations (e.g., macrocell, microcell, or picocell base stations) to which the transceiver device coverage area is being compared.

Figure 2:
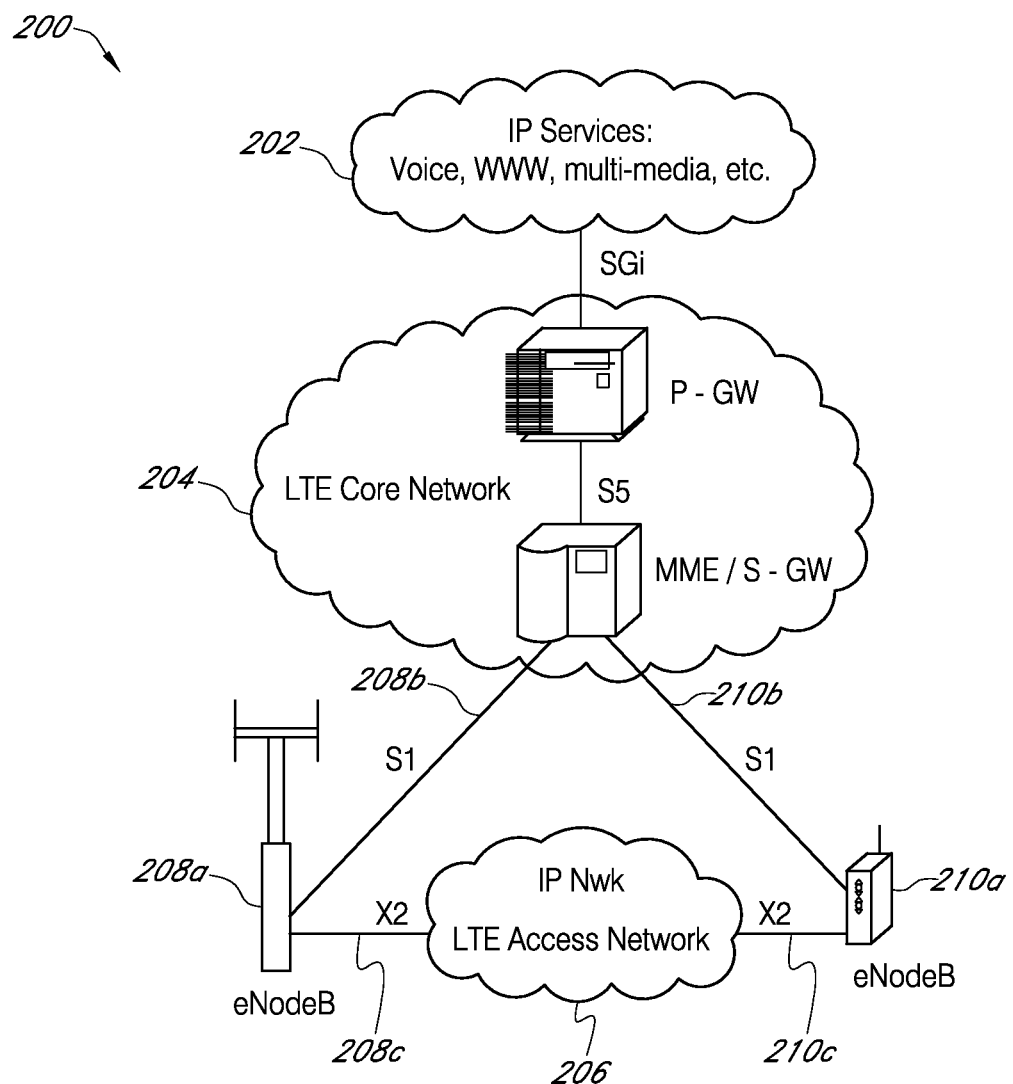
FIG. 2 illustrates various communication paths and networks between wireless base stations in accordance with an embodiment of the present invention.

FIG. 2 illustrates a network architecture 200 with various communication paths and networks between wireless base stations in accordance with an embodiment of the present invention. The base stations 208a and 210a depicted in FIG. 2 may be representative of the base stations 104a, 106a, and 108a depicted in FIG. 1. In an embodiment, the network architecture 200 may be consistent with a LTE network topology, while other specific topologies may be utilized dependent on the chosen mobile standards such as GSM or UMTS. In particular, the network architecture 200 depicts two eNodeB base stations 208a and 210a in a 3GPP LTE (Third Generation Partnership Project Long Term Evolution) access network, which may architecturally be considered to be femtocells. Base stations 208a and 210a may communicate with each other via an X2 interface 208c and 210c using an IP network 206. Base stations 208a and 210a may exchange information regarding their radio resource usage. Other communications between base stations 208a and 210a may take place over the X2 interface as defined in the 3GPP LTE interface.

Base stations 208a and 210a interface with the Evolved Packet Core (EPC) network 204 using S1 connections 208b and 210b. The EPC network 204 further includes: a Serving Gateway (S-GW) which routes and forwards user data packets as well as facilitates handovers; a Mobility Management Entity (MME) which acts as a key control node for user equipment tracking and authentication; and a Packet Data Network Gateway (P-GW), which performs policy enforcement, packet filtering for each user, charging support, and/or lawful interception and packet screening. Network architecture 200 also includes an IP network 202 providing access to the Internet, voice, multimedia, etc. The P-GW may interface with the MME/S-GW using the S5 interface, while SGi provides a reverence point between the P-GW and the IP network 202.

Figure 3:
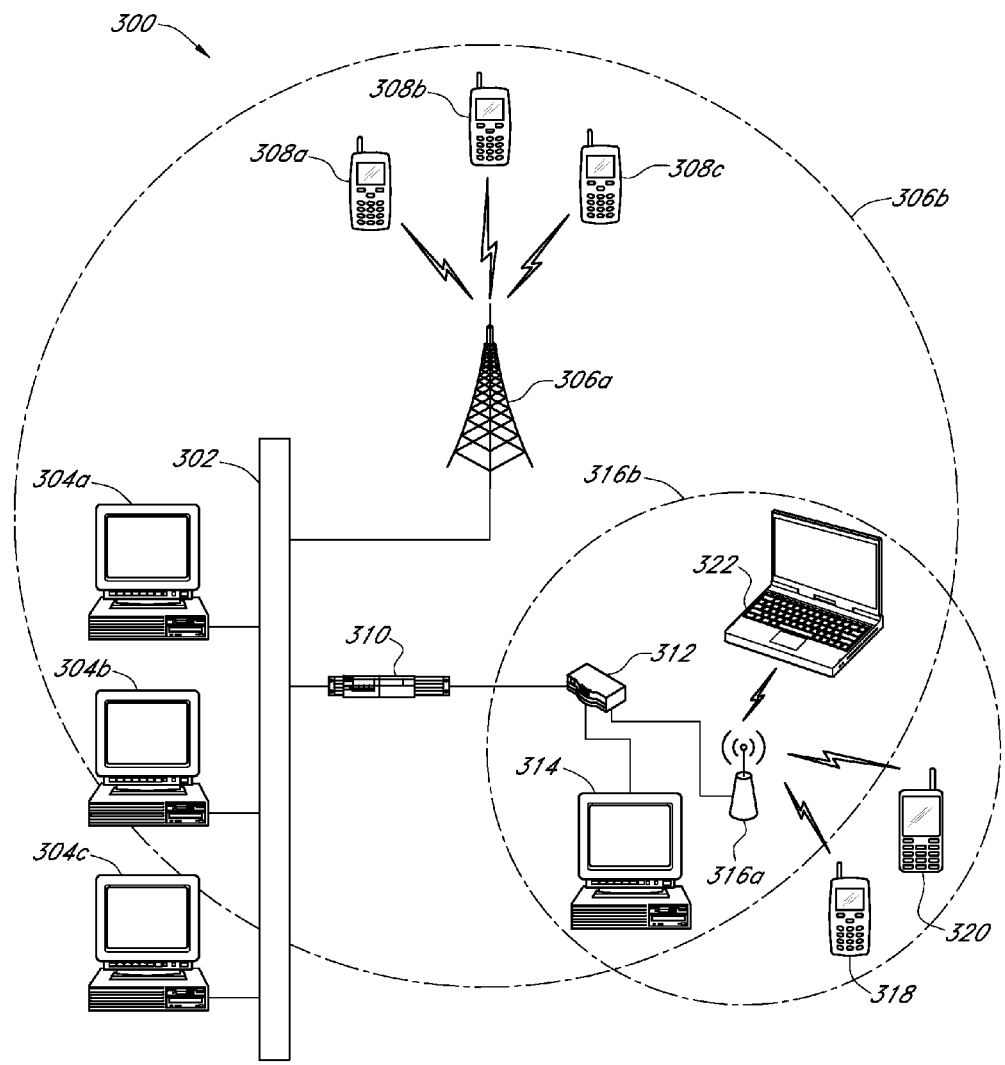
FIG. 3 illustrates a perspective view of a networked computing system in accordance with an embodiment of the present invention.

FIG. 3 illustrates a perspective view of a networked computing system 300 including various wireline and wireless computing devices that may be utilized to implement any of the reference frequency adjustment processes associated with various embodiments of the present invention. The networked computing system 300 may include, but is not limited to, one or more remote base station devices 306a, which may be associated with a macrocell, a microcell, or a picocell base station that may be a neighboring base station to one or more short-range transceiver devices 316a (e.g., a femtocell or picocell device) within a particular region of the networked computing system 300; a group of remote service provider devices 304a-c, including server computers or any other common network device known in the art such as routers, gateways, or switch devices, which can support network resource allocation and/or digital data communication services to various network subscriber computing devices (e.g., any of the devices 308a-c, 310, 312, 314, 316a, 318, 320, and 322); a data communications network 302, including both Wide Area Network 306b (WAN), and Local Area Network 316b (LAN) portions; a variety of wireless user equipment, including: cellular phone or PDA devices 308a-c, 318 and 320, and a laptop or netbook computer 322, along with any other common portable wireless computing devices well known in the art (e.g., handheld gaming units, personal music players, video recorders, electronic book devices, etc.) that are capable of communicating with the data communications network 302 utilizing one or more of the remote base stations 306a, the short-range transceiver device 316a, or any other common wireless or wireline network communications technology; one or more network gateways or switch devices 310 and router 312 that can facilitate data communications processes within the LAN and between the LAN and the WAN of the data communications network 302; and a desktop computer 314 optionally connected to the LAN.

In an embodiment, remote base station 306a may be representative of the base station 102a in FIG. 1, while the short-range transceiver device 316a may be representative of the base stations 104a, 106a, and 108a in FIG. 1 and base stations 208a and 210a in FIG. 2. FIG. 3 only illustrates one short-range transceiver device 316a, although it may be apparent that the networked computing system 300 may include multiple base stations similar to the topology in FIG. 1. Additionally, data communications network 302 may correspond to networks 202, 204, and 206 in FIG. 2. Further, remote service provider devices 304a-c may correspond with the P-GW and/or the MME/S-GW of FIG. 2.

In an embodiment, the remote base station 306a, the short-range transceiver device 316a (e.g., a femtocell or picocell base station), the remote service provider devices 304a-c, or any of the user equipment (e.g., 308a-c, 314, 318, 320, or 322) may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, the remote base station 306a may employ any number of common server, desktop, laptop, and personal computing devices.

In an embodiment, the user equipment (e.g., 308a-c, 314, 318, 320, or 322) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions of the data communications network 302 of FIG. 3 may employ, but are not limited to, any of the following common communications technologies: optical fiber, coaxial cable, twisted pair cable, Ethernet cable, and powerline cable, along with any wireless communication technology known in the art. In an embodiment, the remote wireless base station 306a, the wireless user equipment (e.g., 308a-c, 318, 320, or 322), as well as any of the other LAN connected computing devices (e.g., 310, 312, or 314) may include any standard computing software and hardware necessary for processing, storing, and communicating data amongst each other within the networked computing system 300. The computing hardware realized by any of the network computing system 300 devices (e.g., 304a-c, 306a, 308a-c, 310, 312, 314, 316a, 320, or 322) may include, but is not limited to: one or more processors, volatile and non-volatile memories, user interfaces, transcoders, and wireline and/or wireless communications transceivers, etc.

Further, any of the networked computing system 300 devices (e.g., 304a-c, 306a, 308a-c, 310, 312, 314, 316a, 318, 320, or 322) may be configured to include one or more computer-readable media (e.g., any common volatile or non-volatile memory type) encoded with a set of computer readable instructions, which when executed, performs a portion of any of the usage-based optimization processes associated with various embodiments of the present invention.

In an embodiment, user equipment (e.g., 308a-c, 318, 320, and 322) may simultaneously reside within the wireless communications coverage area 316b of the short-range transceiver device 316a as well as within the wireless communications coverage area 306b of the base station 306a, or the user equipment may reside in a single, non-overlapping area of LAN 316b or WAN 306b.

Figure 4:
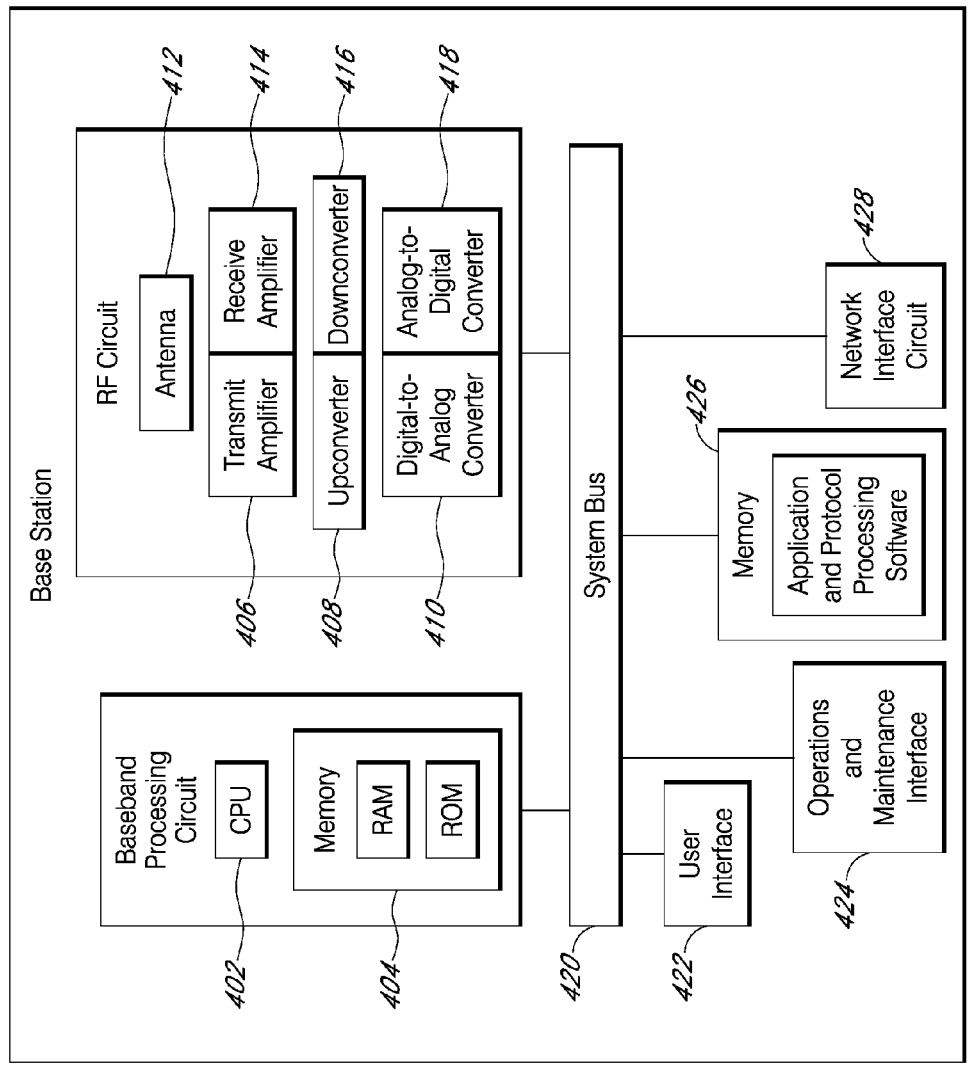
FIG. 4 illustrates a block diagram view of a base station in accordance with an embodiment of the present invention.

FIG. 4 illustrates a block diagram view of a base station device 400 (e.g., a femtocell or a picocell device) that may be representative of the base stations 104a, 106a, and 108a in FIG. 1, the base stations 208a and 210a in FIG. 2, and the short-range transceiver device 316a in FIG. 3. In accordance with an embodiment of the present invention, the base station device 400 may include, but is not limited to, a baseband processing circuit including at least one central processing unit (CPU) 402. In an embodiment, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 is responsible for executing all computer programs stored on the transceiver device's 400 volatile (RAM) and nonvolatile (ROM) system memories, 404 and 426.

The base station device 400 may also include, but is not limited to, a radio frequency (RF) circuit for transmitting and receiving data to and from the network. The RF circuit may include, but is not limited to, a transmit path including a digital-to-analog converter 410 for converting digital signals from the system bus 420 into analog signals to be transmitted, an upconverter 408 for setting the frequency of the analog signal, and a transmit amplifier 406 for amplifying analog signals to be sent to the antenna 412. The upconverter 408 may also be capable of correcting the frequency drift in accordance with an aspect of the present invention. Further, the RF circuit may also include, but is not limited to, a receive path including the receive amplifier 414 for amplifying the signals received by the antenna 412, a downconverter 416 for reducing the frequency of the received signals, and an analog-to-digital converter 418 for outputting the received signals onto the system bus 420. The downconverter 416 may also be capable of monitoring the received RF signals for interference indicating frequency drifting in accordance with an aspect of the present invention. The system bus 420 facilitates data communication amongst all the hardware resources of the base station device 400.

Further, the base station device 400 may also include, but is not limited to a user interface 422; operations and maintenance interface 424; memory 426 storing application and protocol processing software; and a network interface circuit 428 facilitating communication across the LAN and/or WAN portions of the data communications network 302 (i.e., a backhaul network).

Figure 5:
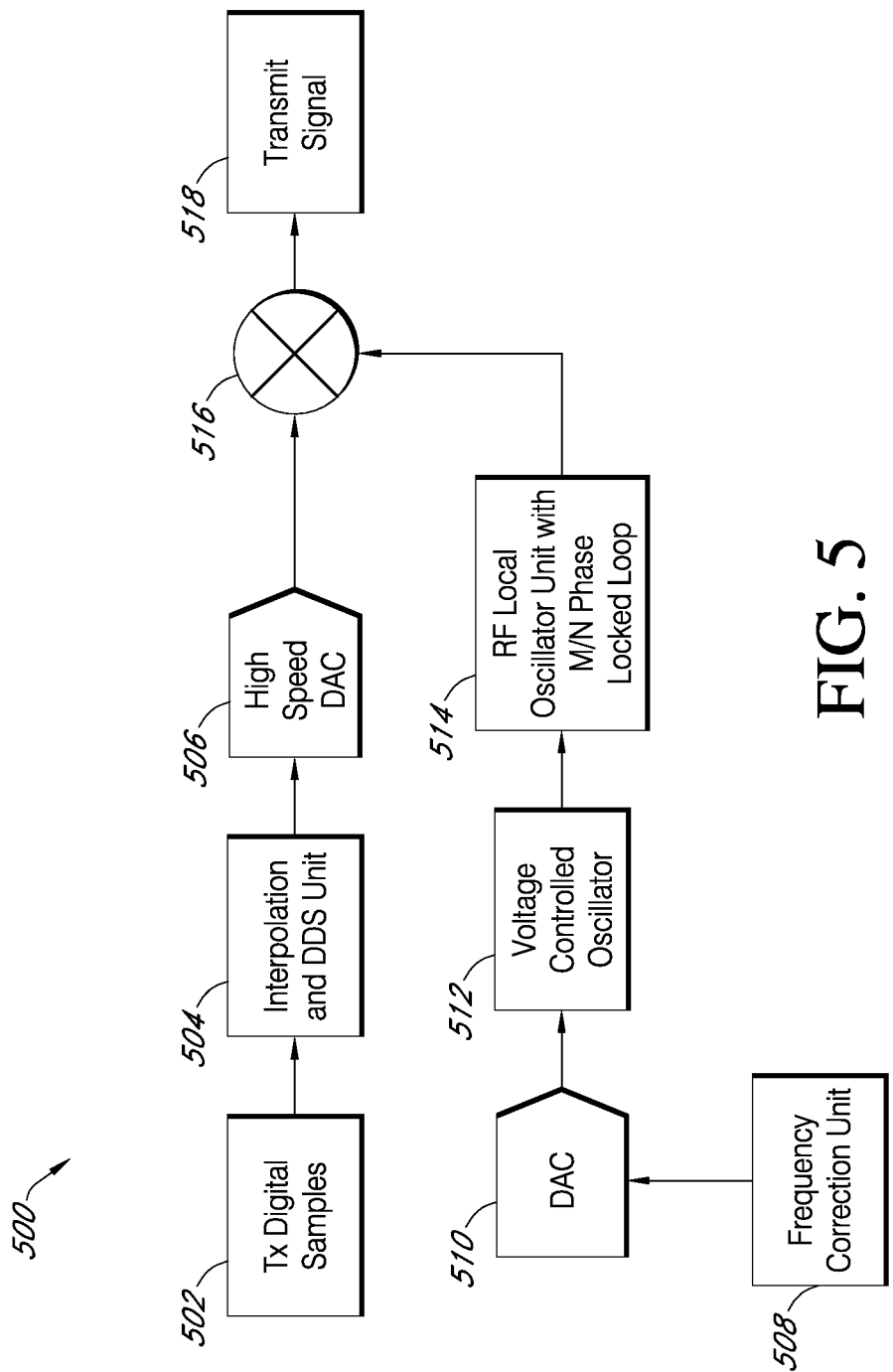
FIG. 5 illustrates a block diagram of a modulation unit for correcting a frequency using input to a voltage controlled oscillator in accordance with an embodiment of the present invention.

FIG. 5 illustrates a block diagram of a modulation unit 500 for correcting a frequency using input to a voltage-controlled oscillator in accordance with an embodiment of the present invention. In one embodiment, the modulation unit 500 may be found in the upconverter 408 of the base station device 400 in FIG. 4. Generally, the modulation unit 500 may receive transmission data, synchronization data, and frequency correction information as inputs in order to generate a transmit signal as an output. Specifically, the modulation unit 500 receives transmission data as Tx Digital Samples 502 and passes the samples 502 to the Interpolation and Direction Digital Synthesis (DDS) Unit 504. Along with interpolation, which inserts samples in between two existing samples in a predetermined fashion (e.g., linearly) and at predetermined intervals (e.g., one sample equally spaced between two existing samples), the direct digital synthesis performed by the Interpolation and DDS unit 504 formats and inputs the data into the High Speed Digital-to-Analog Converter (DAC) 506. The analog signal generated by the High Speed DAC 506 is mixed at the mixer 516 with a carrier frequency generated by Local Oscillator Unit 514 to generate a transmit signal 518. Thus, components 502, 504, and 506 comprise a first operating path in the modulation unit 500.

A second operating path in modulation unit begins with a frequency correction unit 508. This frequency correction unit 508 may perform a variety of functions, including but not limited to, comparing a packetized time base reference signal from a network (e.g., data communication network 302) against a reference oscillator, or determining a frequency correction based on the detection of interference in a received RF band in accordance with an embodiment of the invention. Generally, the frequency correction unit 508 determines a correction factor for adjusting the voltage-controlled oscillator (VCXO) 512. Data from the frequency correction unit 508 may pass through digital-to-analog converter (DAC) 510 before being input to VCXO 512. In an embodiment of the invention, the VCXO 512 may be referred to as a reference oscillator and its output may be referred to as a reference signal. In this manner the VCXO 512 is algorithmically controlled so that different values applied to the DAC 510 adjust the oscillator frequency of VCXO 512, which in turn adjusts the carrier frequency generated by the Radio Frequency Local Oscillator Unit with M/N Phase Locked Loop (PLL) 514. The carrier frequency generated by the second operating path (i.e., with components 508, 510, 512, and 514) is mixed with the analog signal generated by the first operating path in the mixer 516 to generate the transmit signal 518. The transmit signal may be sent to the transmit amplifier 406 and antenna 412 of FIG. 4 for wireless transmission.

Figure 6:
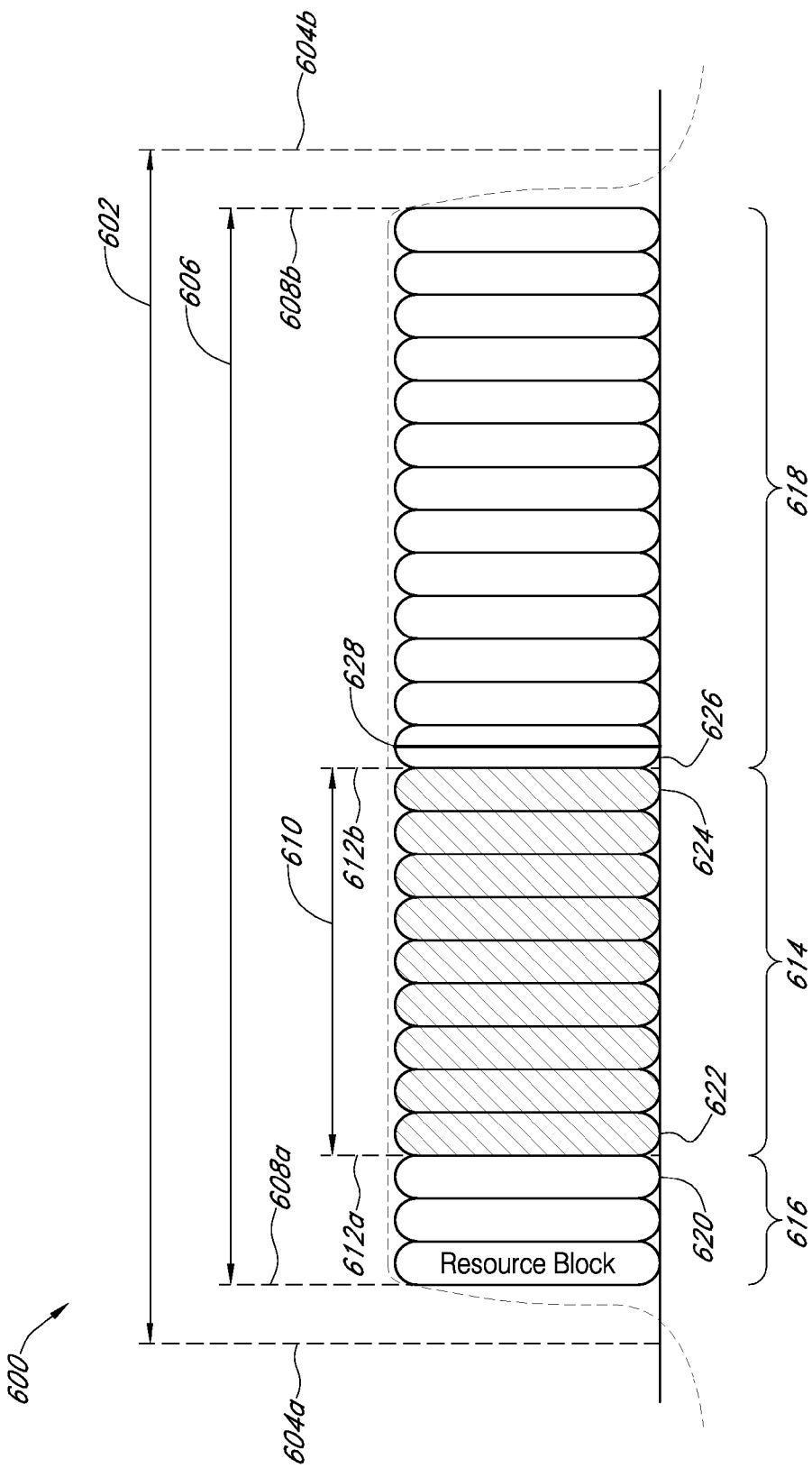
FIG. 6 illustrates a diagram of frequency resources in a wireless transmission in accordance with an embodiment of the present invention.

FIG. 6 illustrates a diagram of frequency resources 600 in a wireless transmission in accordance with an embodiment of the present invention. More specifically, the frequency resources 600 are associated with a 3GPP LTE uplink or downlink communication channel that may be affiliated with various embodiments of the present invention. The frequency resources diagram 600 represents a single radio channel having a set channel bandwidth 602 (e.g., measured in MHz). The channel bandwidth 602 is bordered on both sides by channel edges 604a and 604b. To prevent losing channel edge data communications in the frequency domain (i.e., to prevent losing resource blocks located too close to the channel edges 604a and 604b), data communications in the frequency domain are typically restricted to a reliable transmission bandwidth configuration 606 (bordered by transmission bandwidth configuration edges 608a and 608b) that is smaller than the channel bandwidth 602. This is intended to prevent lossy or degraded data communications. Within the transmission bandwidth configuration 606, only a portion of the available resource blocks may be in use during uplink communications (e.g., communications from a subscriber device to a base station). These resource blocks are known as active resource blocks 614 and they are part of an actual transmission bandwidth 610. The transmission bandwidth 610 is bordered by transmission bandwidth edges 612a and 612b. The remaining resource blocks (e.g., resource block groups 616 and 618) that are not used in a data communication are considered inactive resource blocks (i.e., all resource blocks falling within the transmission bandwidth configuration 606 that are not active resource blocks 614).

In the active resource blocks 614, resource block 622 shares an edge with resource block 620, which is located in the resource block group 616. Further, resource block 624 shares an edge with resource block 626, which is located in the resource block group 618. As will be discussed shortly, frequency drifting can cause interference levels in these edge resource blocks.

Frequency resources 600 may represent either an uplink channel or a downlink channel. In a downlink transmission, frequency resources 600 include a DC carrier 628 that is a component of the LTE downlink waveform resulting from the real-world implementation of an Orthogonal Frequency-Division Multiplexing (OFDM) transmitter. In some transmitter implementations the output of the Inverse Fast Fourier Transform (IFFT) is imposed on a DC level in order to feed the resulting signal into a frequency converter which results in a DC component being added to the transmitted OFDM signal, causing the DC carrier 628 artifact.

It should be understood that the frequency resources 600 associated with 3GPP LTE downlink and uplink communications are solely intended to provide background information for how communications resources may be represented within a frequency domain (channel) structure. As discussed herein, other common communications technologies associated with GSM and UMTS networks are also contemplated as vehicles for carrying out any of the ancillary communications receiving, measuring, monitoring, and adjusting processes associated with various embodiments of the present invention. As such, any LTE based embodiments disclosed herein should not be interpreted to limit the scope of the invention to LTE technology. Instead, these embodiments should be viewed as optional network technology embodiments for carrying out the ancillary communications receiving, measuring, monitoring, and adjusting processes associated with the present invention. Similarly there may be GSM-based and UMTS-based embodiments where the same inventive processes may be achieved utilizing the inherent technologies associated with these different communications technology types.

In accordance with an embodiment of the present invention, the following example illustrates the capability of a smaller cell transceiver device (e.g., any of a base station 104a, 106a, 108a, 208a, 210a, 316a, and 400) to receive more airlink resources than are required for providing services to various user equipment (e.g., any of user equipment 308a-c, 318, 320, and 322). As shown in FIG. 6, the frequency band of operation 610 is parceled into smaller chunks called resource blocks (e.g., 622 and 624). In this example the resource blocks utilized by the transceiver device of interest (e.g., base station 106a) are shaded active resource blocks 614. However, this same transceiver device 106a may receive all of the resource blocks within the transmission bandwidth 606, which includes inactive resource block groups 616 and 618. These inactive resource blocks are not idle, however, but may be in use by surrounding base stations and transceiver devices (e.g., by base stations 104a or 108a), as the same frequency spectrum is often shared amongst many transceiver devices.

In one embodiment, the transceiver device of interest 106a may be configured to receive all the resource blocks of the transmission bandwidth configuration 606, but it only actually uses the shaded subset of active resource blocks 614. There may be several reasons for this restricted use, including excess local interference or simply a lack of need to serve a local traffic load. As will be further described herein, since the transceiver device 106a receives these additional unused or inactive resource blocks, it is fully capable of recognizing (i.e., detecting them) and making measurements on them.

In another embodiment, the transceiver device may be configured to receive only the transmission bandwidth 610 and its corresponding active resource blocks 614. In this embodiment, the base station might only have knowledge of the resource blocks used for its transmissions and would not be directly receiving and/or measuring the inactive resource block groups 616 and 618. However, it will become apparent that even in this embodiment the base station may indirectly receive knowledge of the inactive resource block groups 616 and 618 through interference at the edge of the received active resource blocks 614.

Next, the operation of the system is described by way of example. Initially, the base station (e.g., 104a, 106a, 108a, 208a, 210a, 316a, and 400) begins communicating with a subscriber device. When the system time bases are synchronized, the frequency resources are synchronized in a manner shown in FIG. 6. In this example, the base station may be receiving a packetized IP time reference which keeps the base station within specification. During operation, however, the base station 106a may not receive the network time reference and the base station frequency may begin to drift. Alternatively, the base station 106a may continue to receive a network time reference but may continuously monitor the received RF band 606 or 610 for interference. An example of frequency drift is shown in FIG. 7.

Figure 7:
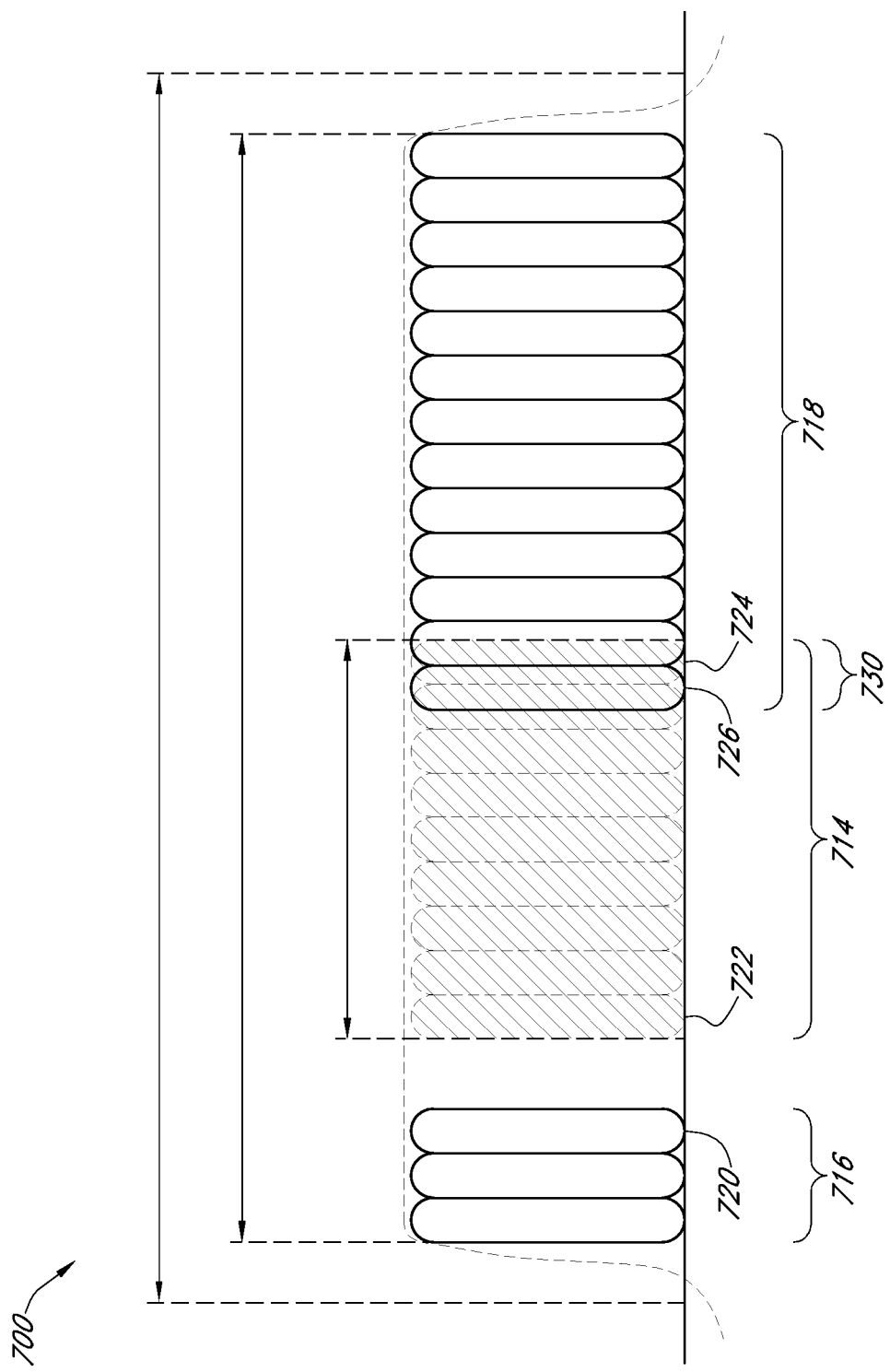
FIG. 7 illustrates a diagram of frequency drift and interference at the edge of the received radio frequency band in accordance with an embodiment of the present invention.

FIG. 7 illustrates a diagram of frequency drift 700 and interference at the edge of the received radio frequency band in accordance with an embodiment of the present invention. For ease of reference, similar features in FIG. 6 have been similarly numbered in FIG. 7 (e.g. active resource blocks 614 in FIG. 6 are active resource blocks 714 in FIG. 7). Note that a corresponding DC carrier is not shown in the diagram of frequency drift 700 as FIG. 7 represents an uplink communication.

As a reference frequency in a base station (e.g., the output of the RF Local Oscillator 514 in a base station 106a) drifts, interference levels in a portion of frequency resources utilized by the base station 106a may vary accordingly. For example, a base station of interest may be base station 106a, while a neighboring base station may be base station 104a. In this example, base station 106a would utilize active frequency resource blocks 714, while the neighboring base station 104a may use resource blocks 718. As the reference frequency in base station 106a drifts, active resource blocks 714 in the received uplink begin to drift. When this occurs, the active resource blocks 714 may infringe on the allocated frequencies of resource blocks 718. In this situation, resource blocks 724 and 726, which shared an edge as adjacent resource blocks in FIG. 6, now overlap in frequencies.

This overlap (i.e., adjacent channel interference) can be seen as overlap 730 depicting the drift of active resource blocks 714 to cause interference with the resource blocks 718 used by a neighboring base station. An interference level (e.g., a signal-to-interference-plus-noise (SINR) level) for resource block 724 may significantly increase as a result of this frequency drift, while resource block 722 may not show the proportional rise in interference level. Conversely, if the active resource blocks shifted in the other direction, resource block 722 might then be interfering with resource block 720 located in the resource block group 716. In this example, an interference level in resource block 722 may indicate the frequency drift while resource block 724 may not show a corresponding change.

Regardless of the direction of frequency drift, the base station monitors an interference level of a resource block at the edge of the received RF band and determines when a frequency drift may have occurred. A certain level of interference will be expected, so any interference determination algorithm must consider a variety of factors to determine a frequency drift including: relative interference levels in resource blocks; specific resource blocks allocated to various base stations; status of a network based time reference, etc. Once the base station determines that a frequency drift has occurred, the base station 106a may adjust a reference of the base station (e.g., a reference oscillator) using the modulation unit 500 in FIG. 5. After the base station adjusts the reference to compensate for the frequency drift, the base station may continue to monitor the interference levels and iteratively refine this process. This operation may occur automatically and dynamically without user intervention at any time unit or event interval.

Figure 8:
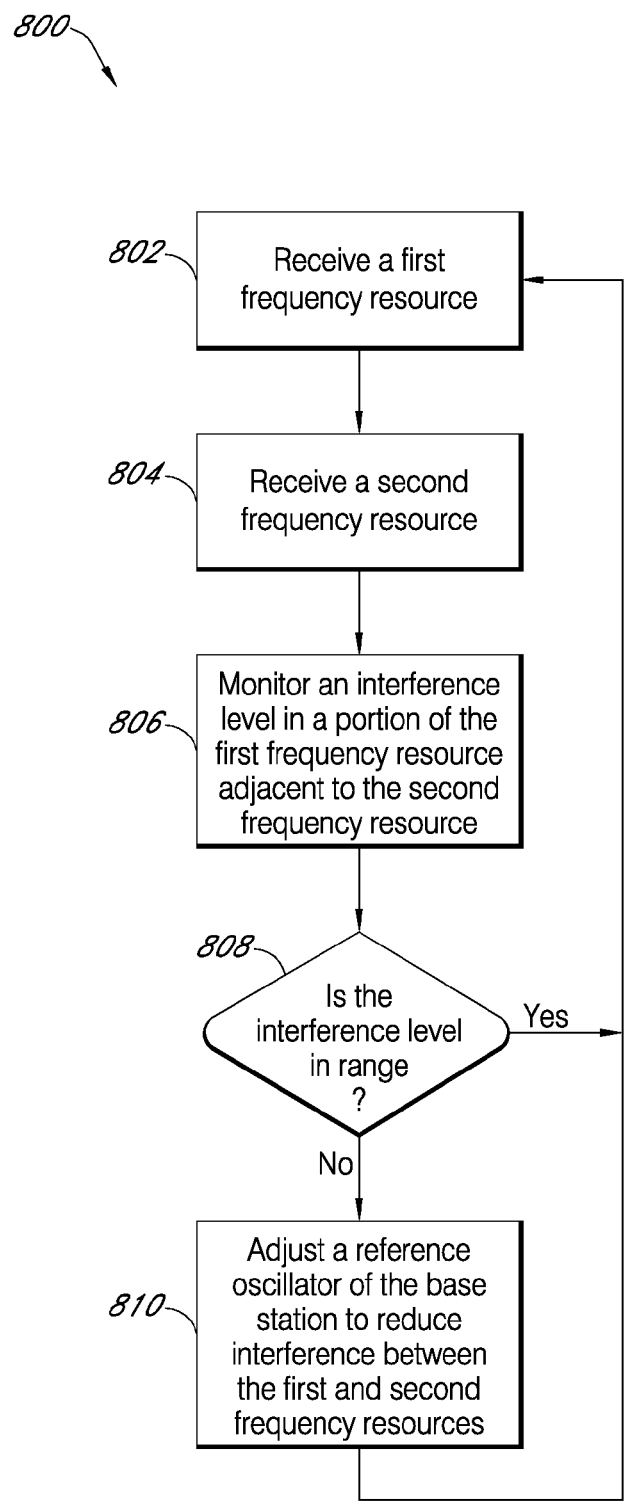
FIG. 8 illustrates a flow diagram depicting processes for correcting a frequency error in accordance with an embodiment of the present invention.

FIG. 8 illustrates a flow diagram 800 depicting processes for correcting a frequency error in accordance with an embodiment of the present invention. It should be understood that this process 800 could be executed using one or more computer-executable programs stored on one or more computer-readable media located on any one of the base station devices (e.g., 104a, 106a, 108a, 208a, 210a, 316a, and 400), or collaboratively on the network base station 102a or 306a, the group of remote service provider devices 304a-c, or on any other common service provider device known in the Art of FIGS. 1-4. At block 802, a first frequency resource is received. This first frequency resource may correspond to the active resource block 614, or a specific resource block 624 in the active resource block 614. This first frequency resource may be received as a portion of the uplink transmission between a subscriber device (e.g., 308a-c, 318, 320, or 322) and a base station (e.g., 104a, 106a, 108a, 208a, 210a, 316a, and 400). For the purpose of this example, it will be assumed the base station is base station 106a of FIG. 1.

Next, at block 804, a second frequency resource is received. This second frequency resource may correspond to the inactive resource block groups 616 or 618, or a specific resource block such as resource block 626. This second frequency resource may be a frequency resource used by a neighboring base station 104a. The base station 106a may receive this second frequency resource in a variety of ways: directly from the base station 104a as a wireless transmission; directly from the base station 104a via the X2 interface; via an S1 connection with the network or wirelessly from the base station 102a; through information gathered by a subscriber device (e.g., 308a-c, 318, 320, or 322) which has monitored the second frequency resource; or indirectly as interference with the first frequency resource. In this last example, as interference with the first frequency resource, the base station 106a may receive the second frequency resource by encountering interference from the second frequency resource used by the neighboring base station.

At block 804, the base station 106a monitors an interference level at the intersection of the first and second frequency resources. This monitoring may comprise various operations, including but not limited to: monitoring a SINR interference level of the active resource blocks 614/714 or an individual resource block 624/724 at the edge of the received RF band; comparing resources allocated to the base station 106a and a neighboring base station 104a; comparing interference levels between resource blocks within an active resource block group, etc. A frequency of the base station 106a may drift far enough so that active resource blocks 614/714 may begin to collide with the resource blocks 618/718 used by a neighboring base station 104a. The monitoring step 806 will detect significantly more interference within the resource blocks subject to the collisions, i.e. within the overlapping region 730. A determination of whether the interference level is within an interference range is made in block 808. This excessive interference is an indication to the base station 106a that the modulation unit 500 is out of synchronization, and the base station may take corrective action.

More specifically, at block 810 the base station 106a may adjust a reference oscillator of the base station to reduce interference between the first and second frequency resources. Base station 106a may use a frequency correction algorithm in the frequency correction unit 508 to vary the input to the VCXO 512. In this manner the base station adjusts the carrier frequency of its frequency resources 714 to bring the frequency resources 714 back into frequency alignment (e.g., frequency alignment generally seen in the frequency resources 600 of FIG. 6). This process 800 may repeat to continuously monitor the frequency resources 614/714 used by the base station 106a.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A wireless communication system comprising:
a mobile device;
a first base station using a first frequency resource, the first base station communicating with the mobile device using a carrier frequency derived from a reference frequency; and
a second base station using a second frequency resource;
wherein the first base station is configured to:
monitor an interference level of an intersection between the first frequency resource and the second frequency resource by monitoring an interference level of a resource block of the first frequency resource at an edge of the first frequency resource adjacent to the second frequency resource;
determine whether or not the interference level of the resource block indicates a frequency error; and
adjust the reference frequency of the first base station to correct the frequency error when the monitored interference level of the resource block indicates a frequency error.

2. The system of claim 1, wherein the frequency error is a result of a frequency drift of the reference frequency.

3. The system of claim 1, wherein adjusting the reference frequency of the first base station reduces an interference level between the first frequency resource and the second frequency resource.

4. The system of claim 1, wherein the first frequency resource is a first frequency band used by the first base station to wirelessly communicate with at least one mobile device, the first frequency band including a plurality of contiguous resource blocks, the plurality of contiguous resource blocks including the monitored resource block, and wherein the second frequency resource is a second frequency band used by the second base station to wirelessly communicate with at least one mobile device, the second frequency band including a plurality of contiguous resource blocks.

5. The system of claim 1, wherein the first base station is associated with a first coverage area and the second base station is associated with a second coverage area, and wherein at least a portion of the first coverage area and at least a portion of the second coverage spatially overlap.

6. The system of claim 1, wherein the first base station is a femtocell base station.

7. A computer implemented method for reducing wireless interference in a base station, comprising:
- receiving a first frequency resource used by a first base station, the first base station using a carrier frequency derived from a reference frequency to communicate with a mobile device;
- monitoring an interference level of a resource block at an edge of the first frequency resource adjacent to a second frequency resource used by a second base station;
- determining whether or not the interference level of the resource block indicates a frequency error; and
- adjusting the reference frequency of the first base station to correct the frequency error if the interference level of the resource block indicates a frequency error.

8. The method of claim 7, wherein the frequency error is a result of a frequency drift of the reference frequency.

9. The method of claim 7, wherein adjusting the reference frequency of the first base station reduces an interference level between the first frequency resource and the second frequency resource that is used by the second base station, the second base station having a coverage area that overlaps with a coverage area of the first base station.

10. The method of claim 7, wherein receiving the first frequency resource comprises:
- receiving an uplink transmission from the mobile device by the first base station.

11. The method of claim 7, wherein the first frequency resource is a first frequency band used by the first base station to wirelessly communicate with at least one mobile device, the first frequency band including a plurality of contiguous resource blocks, the plurality of contiguous resource blocks including the monitored resource block, and
- wherein the second frequency resource is a second frequency band used by the second base station to wirelessly communicate with at least one mobile device, the second frequency band including a plurality of contiguous resource blocks.

12. The method of claim 7, wherein the frequency error is a frequency drift of the reference frequency used by the first base station.

13. The method of claim 7, wherein the adjusting is performed automatically by the first base station in response to the determination of the frequency error.

14. A non-transitory computer readable medium encoded with computer-executable instructions for reducing wireless interference in a base station, which when executed, performs a method comprising:
- receiving a first frequency resource used by a first base station, the first base using a carrier frequency derived from a reference frequency to communicate with a mobile device;
- monitoring an interference level of a resource block at an edge of the first frequency resource adjacent to a second frequency resource used by a second base station;
- determining whether or not the interference level of the resource block indicates a frequency error; and
- adjusting the reference of the first base station to correct to correct the frequency error if the interference level of the resource block indicates a frequency error.

15. The non-transitory computer-readable medium of claim 14, wherein the frequency error is a result of a frequency drift of the reference frequency.

16. The non-transitory computer-readable medium of claim 14, wherein adjusting the reference frequency of the first base station reduces an interference level between the first frequency resource and the second frequency resource that is used by the second base station, the second base station having a coverage area that overlaps with a coverage area of the first base station.

17. The non-transitory computer-readable medium of claim 14, wherein receiving the first frequency resource comprises receiving an uplink transmission from the mobile device by the first base station.

18. The non-transitory computer-readable medium of claim 14, wherein the first frequency resource is a first frequency band used by the first base station to wirelessly communicate with at least one mobile device, the first frequency band including a plurality of contiguous resource blocks, the plurality of contiguous resource blocks including the monitored resource block, wherein the second frequency resource is a second frequency band used by the second base station to wirelessly communicate with at least one mobile device, the second frequency band including a plurality of contiguous resource blocks; and
- wherein determining whether or not the interference level of the resource block indicates a frequency error includes comparing the interference level of the resource block to interference levels of one or more other resource blocks within the plurality of contiguous resource blocks.

19. The non-transitory computer-readable medium of claim 14, wherein the adjusting is performed automatically by the first base station in response to the determination of the frequency error.

* * * * *